United States Patent
Ortiz-Soto et al.

(10) Patent No.: US 11,635,035 B2
(45) Date of Patent: *Apr. 25, 2023

(54) FAST TORQUE RESPONSE FOR BOOSTED ENGINES

(71) Applicant: Tula Technology, Inc., San Jose, CA (US)

(72) Inventors: Elliott A. Ortiz-Soto, San Jose, CA (US); Shahaboddin Owlia, Royal Oak, MI (US)

(73) Assignee: Tula Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/569,308

(22) Filed: Jan. 5, 2022

(65) Prior Publication Data

US 2022/0128011 A1    Apr. 28, 2022

Related U.S. Application Data

(63) Continuation-in-part of application No. 17/080,082, filed on Oct. 26, 2020, now Pat. No. 11,248,546.

(51) Int. Cl.
*F02D 41/00* (2006.01)
*F02B 37/24* (2006.01)
(Continued)

(52) U.S. Cl.
CPC .......... *F02D 41/0007* (2013.01); *F02B 37/24* (2013.01); *F02D 41/1454* (2013.01);
(Continued)

(58) Field of Classification Search
CPC .. F02D 41/0007; F02D 41/1454; F02D 41/18; F02D 2200/0406; F02D 2200/1002;
(Continued)

(56) References Cited

U.S. PATENT DOCUMENTS 4,434,767 A    3/1984    Kohama et al.
4,489,695 A    12/1984    Kohama et al.
(Continued)

FOREIGN PATENT DOCUMENTS

JP    09-177555    7/1997
JP    2015135079 A  *  7/2015    .............. F02B 33/44
(Continued)

OTHER PUBLICATIONS

Ortiz-Soto et al., U.S. Appl. No. 17/080,082, filed Oct. 26, 2020.
(Continued)

*Primary Examiner* — Sizo B Vilakazi
*Assistant Examiner* — Brian R Kirby
(74) *Attorney, Agent, or Firm* — Beyer Law Group LLP

(57) ABSTRACT

Engine controllers and control schemes are provided for managing engine state transitions requiring increased compressor pressure ratios in turbocharged engines. In some circumstances, turbo lag can be mitigated by initially transitioning the engine to an intermediate engine state that directly or indirectly increases airflow through the engine and turbocharger relative to what would be possible if the engine were immediately commanded to operate at the target engine state. After reaching a point where the desired torque is actually generated at the intermediate engine state, the operational settings are gradually reduced to the target effective firing density while increasing the operational compressor pressure ratio to the target compressor ratio.

38 Claims, 4 Drawing Sheets

(51) Int. Cl.
*F02D 41/14* (2006.01)
*F02D 41/18* (2006.01)

(52) U.S. Cl.
CPC ...... *F02D 41/18* (2013.01); *F02D 2200/0406* (2013.01); *F02D 2200/1002* (2013.01); *F02D 2250/21* (2013.01)

(58) Field of Classification Search
CPC ............ F02D 2250/21; F02D 13/0219; F02D 2041/001; F02D 41/008; F02D 41/0087; F02D 17/02; F02B 37/24; F02B 37/12; Y02T 10/12; Y02T 10/40; F02P 5/045; F02P 5/1504; F02P 9/002
See application file for complete search history.

(56) References Cited

U.S. PATENT DOCUMENTS

| | | | |
|---|---|---|---|
| 4,509,488 A | 4/1985 | Forster et al. | |
| 4,697,422 A * | 10/1987 | Ueno | F02B 37/22 60/602 |
| 5,377,631 A | 1/1995 | Schechter | |
| 5,829,254 A | 11/1998 | Hayashi et al. | |
| 6,158,411 A | 12/2000 | Morikawa | |
| 6,408,625 B1 * | 6/2002 | Woon | F02D 41/0087 60/608 |
| 6,619,033 B2 * | 9/2003 | Adler | F02D 41/405 60/274 |
| 6,619,258 B2 | 9/2003 | McKay et al. | |
| 7,063,062 B2 | 6/2006 | Lewis et al. | |
| 7,066,136 B2 | 6/2006 | Ogiso | |
| 7,086,386 B2 | 8/2006 | Doering | |
| 7,503,312 B2 | 3/2009 | Surnilla et al. | |
| 7,577,511 B1 | 8/2009 | Tripathi et al. | |
| 7,849,835 B2 | 12/2010 | Tripathi et al. | |
| 7,886,715 B2 | 2/2011 | Tripathi et al. | |
| 7,930,087 B2 | 4/2011 | Gibson et al. | |
| 7,954,474 B2 | 6/2011 | Tripathi et al. | |
| 8,099,224 B2 | 1/2012 | Tripathi et al. | |
| 8,131,445 B2 | 3/2012 | Tripathi et al. | |
| 8,131,447 B2 | 3/2012 | Tripathi et al. | |
| 8,616,181 B2 | 12/2013 | Sahandiesfanjani et al. | |
| 8,701,628 B2 | 4/2014 | Tripathi et al. | |
| 9,086,020 B2 | 7/2015 | Tripathi et al. | |
| 9,175,629 B2 * | 11/2015 | Cunningham | F02D 11/105 |
| 9,328,672 B2 | 5/2016 | Serrano et al. | |
| 9,387,849 B2 | 7/2016 | Soliman et al. | |
| 9,399,964 B2 | 7/2016 | Younkins et al. | |
| 9,476,373 B2 | 10/2016 | Younkins et al. | |
| 9,512,794 B2 | 12/2016 | Serrano et al. | |
| 9,574,489 B2 | 2/2017 | Schenker et al. | |
| 9,745,905 B2 * | 8/2017 | Pirjaberi | F02D 37/02 |
| 10,138,860 B2 * | 11/2018 | Nagashima | F02D 41/0002 |
| 11,248,546 B1 * | 2/2022 | Ortiz-Soto | F02B 37/12 |
| 2004/0074474 A1 * | 4/2004 | Stroh | F02D 41/182 123/436 |
| 2005/0274357 A1 | 12/2005 | Matthews et al. | |
| 2009/0018733 A1 * | 1/2009 | Livshiz | F02D 11/105 701/54 |
| 2010/0050993 A1 | 3/2010 | Zhao et al. | |
| 2011/0144884 A1 * | 6/2011 | Miah | B60W 10/06 477/183 |
| 2013/0092127 A1 * | 4/2013 | Pirjaberi | F02D 17/02 123/406.23 |
| 2013/0340708 A1 * | 12/2013 | Panciroli | F02D 41/0085 123/395 |
| 2014/0067230 A1 * | 3/2014 | Liu | F02B 37/18 701/102 |
| 2014/0260241 A1 * | 9/2014 | Jankovic | F02B 37/16 60/273 |
| 2016/0017824 A1 * | 1/2016 | Touchette | F02D 17/02 123/481 |
| 2016/0108798 A1 * | 4/2016 | VanDerWege | F02B 37/12 60/602 |
| 2016/0108835 A1 * | 4/2016 | Kees | F02D 41/0007 123/344 |
| 2016/0137187 A1 * | 5/2016 | Kanno | B60W 10/08 180/65.265 |
| 2017/0122234 A1 * | 5/2017 | Kuechler | F02D 41/005 |
| 2017/0159554 A1 * | 6/2017 | Wang | F02B 37/18 |
| 2017/0234254 A1 * | 8/2017 | Nagashima | F02D 41/0087 123/406.23 |
| 2017/0350313 A1 | 12/2017 | Lawrence et al. | |
| 2017/0356362 A1 * | 12/2017 | Macewen | F02D 41/009 |
| 2018/0043893 A1 * | 2/2018 | Serrano | B60W 30/1882 |
| 2018/0100459 A1 * | 4/2018 | Dickson | F02B 75/18 |
| 2019/0024575 A1 * | 1/2019 | Maruo | F02B 37/186 |
| 2019/0063347 A1 * | 2/2019 | Xiao | F02D 41/26 |
| 2019/0226378 A1 | 7/2019 | Chen et al. | |
| 2020/0095950 A1 * | 3/2020 | Picot | F02D 41/0087 |
| 2020/0149487 A1 * | 5/2020 | Beinborn | F02D 41/0087 |
| 2020/0318566 A1 * | 10/2020 | Carlson | F02D 17/02 |
| 2022/0128011 A1 * | 4/2022 | Ortiz-Soto | F02D 41/0007 |

FOREIGN PATENT DOCUMENTS

| | | |
|---|---|---|
| WO | WO 2010/006311 | 1/2010 |
| WO | WO 2011/085383 | 7/2011 |

OTHER PUBLICATIONS

International Search Report and Written Opinion dated Dec. 7, 2021 from International Application No. PCT/US2021/048874.

* cited by examiner

FAST TORQUE RESPONSE FOR BOOSTED ENGINES

CROSS-REFERENCE TO RELATED APPLICATIONS

This application is a Continuation-in-Part of U.S. application Ser. No. 17/080,082, filed on Oct. 26, 2020, which is incorporated by reference herein in its entirety.

BACKGROUND

The present application relates to the use of cylinder output level modulation (e.g. skip fire and/or Hi/Lo fire) and/or various air management techniques in turbocharged engines to help improve torque response in a fuel efficient manner.

Most vehicles in operation today (and many other devices) are powered by internal combustion (IC) engines. Internal combustion engines typically have a plurality of cylinders or other working chambers where combustion occurs. Under normal driving conditions, the torque generated by an internal combustion engine needs to vary over a wide range in order to meet the operational demands of the driver.

The fuel efficiency of many types of internal combustion engines can be improved by varying the displacement of the engine. This allows for the full torque to be available when required, yet can significantly reduce pumping losses and improve thermodynamic efficiency through the use of a smaller displacement when full torque is not required. The most common method of varying the displacement of an engine involves deactivating a group of cylinders substantially simultaneously. In this approach, no fuel is delivered to the deactivated cylinders and their associated intake and exhaust valves are kept closed as long as the cylinders remain deactivated.

Another engine control approach that varies the effective displacement of an engine is referred to as "skip fire" engine control. In general, skip fire engine control contemplates selectively skipping the firing of certain cylinders during selected firing opportunities. Skip fire engine operation is distinguished from conventional variable displacement engine control in which a designated set of cylinders are deactivated substantially simultaneously and remain deactivated as long as the engine remains in the same variable displacement mode. Thus, the sequence of specific cylinders firings will always be exactly the same for each engine cycle during operation in a variable displacement mode (so long as the engine remains in the same displacement mode), whereas that is often not the case during skip fire operation.

Skip fire engine control can also be an effective emissions management tool in many applications, as for example in diesel and other lean burn engine control.

Boosted engines (e.g., engines having turbochargers or superchargers) have unique requirements and challenges. The present application describes engine control features and enhancements that can improve the performance of boosted engines in a variety of applications using skip fire or other cylinder output level modulation techniques.

SUMMARY

Engine controllers and control schemes are provided for managing engine state transitions requiring increased compressor pressure ratios in turbocharged engines. In some circumstances, turbo lag can be mitigated by initially transitioning the engine to an intermediate engine state that directly or indirectly increases airflow through the engine and turbocharger relative to what would be possible if the engine were immediately commanded to operate at the target engine state. After reaching a point where the desired torque is actually generated at the intermediate engine state, the operational settings are gradually reduced to the target effective firing density while increasing the operational compressor pressure ratio to the target compressor ratio.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

Figure 1:
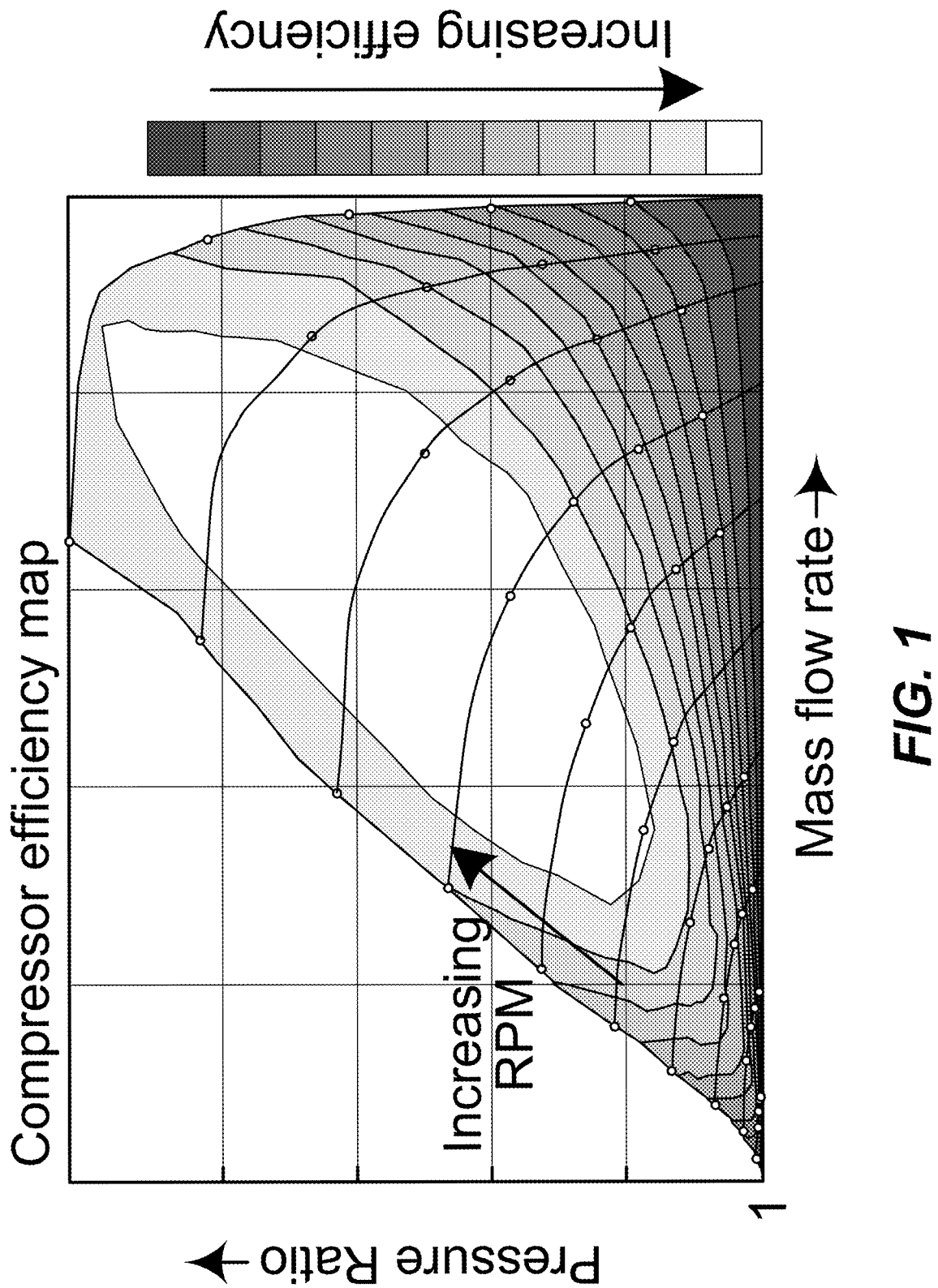
FIG. 1 is a representative radial compressor efficiency map for a production turbocharger.

In general, skip fire engine operation facilitates finer control of the effective engine displacement than is possible using a conventional variable displacement approach. For example, firing every third cylinder in a 4 cylinder engine would provide an effective displacement of $\frac{1}{3}^{rd}$ of the full engine displacement, which is a fractional displacement that is not obtainable by simply deactivating a set of cylinders. Conceptually, virtually any effective displacement can be obtained using skip fire control, although in practice most implementations restrict operation to a set of available firing fractions, sequences or patterns. When discussing skip fire engine operation, reference is often made to the firing fraction (FF) which is the fraction or percentage of cylinder working cycles that are actually fueled and fired (e.g., $\frac{1}{3}$, $\frac{2}{5}$, $\frac{3}{4}$, etc.).

The Applicant has developed a technology referred to as dynamic skip fire (DSF) in which firing decisions are made on a cylinder firing opportunity by cylinder firing opportunity basis. In many applications, a single firing decision is made at a time, whereas in others, firing decisions for small sets of cylinders may be made at the same time (e.g., a engine cycle by engine cycle basis). Various aspects of dynamic skip fire are described in a number of patents including U.S. Pat. Nos. 7,954,474, 7,886,715, 7,849,835, 7,577,511, 8,099,224, 8,131,445, 8,131,447, 8,616,181, 8,701,628, 9,086,020, 9,328,672, 9,387,849, 9,399,964, 9,512,794, 9,745,905, and others, each of which is incorporated herein by reference. Cylinders are typically deactivated during skipped working cycles so that air is not pumped through cylinders during the skipped cycles and there are a variety of different valve actuation management schemes that may be used to accomplish such deactivation.

The individual cylinder control concepts used in dynamic skip fire can also be applied to multi-charge level engine operation in which all cylinders are fired, but individual working cycles are purposely operated at different cylinder output levels. In two-step multi-charge level engine operation, cylinder working cycles can be selectively fired at either a "high" output level, or a "low" output level which generates less torque than a "high" firing. When discussing two-step multi-charge level engine operation, reference is often made to the high fire fraction (HF) which refers to the fraction or percentage of the fired working cycles that are fired at the high output level.

Skip fire and multi-charge level engine operation can be combined in multi-level skip fire engine operation to deliver additive and synergistic fuel consumption improvements. In general, multi-level skip fire contemplates that individual working cycles of an engine may be selectively fired or skipped during individual cylinder working cycles and that fired working cycles may be purposely operated at different cylinder outputs levels in an interspersed manner. In two-step multi-charge level engines, a two-step intake valve lift system is used. In multi-level skip fire operation, the valve control system further has the ability to deactivate a cylinder by deactivating the intake valve(s) during selected cylinder working cycles.

Skip fire, multi-level skip fire, and multi-charge level engine operation may collectively be considered different types of cylinder output level modulation engine operation in which the output of each working cycle (e.g., skip/fire, high/low, skip/high/low, etc.) is varied during operation of the engine. Sometimes the firing decisions are made dynamically on an individual cylinder working cycle by working cycle (firing opportunity by firing opportunity) basis or in small sets such as on an engine cycle by engine cycle basis. The Applicant has described multi-charge level and multi-level skip fire engine operation in a number of patents and patent applications including U.S. Pat. Nos. 9,399,964, 9,476,373, U.S. Patent Application No. 63/043,253, and others, each of which is incorporated herein by reference.

Two-step mDSF combines two-step multi-charge level and DSF. In mDSF, both the firing fraction and the high fire fraction are relevant. When the use of multiple non-zero firing levels is contemplated (e.g., during multi-level skip fire or multi-charge level operation of an engine), it is often helpful to consider an effective firing density (eFD) which correlates to the percentage or fraction of the cylinders that would be fired at a high or reference output. For example, if half of the cylinders are fired at a cylinder output level of 70% of a full firing output and the other half are fired at the full firing output level, then the effective firing density would be 85%. This corresponds to a Firing Fraction of 1.0 and a High fire fraction of 0.5. If the "Low" cylinder output were reduced to 60% of a full firing, then the effective firing density would be reduced to 80% in this example.

Boosting is common in many types of engines, including many large diesel engines. Additionally, downsized, boosted engines are currently a popular powertrain choice for passenger vehicles. Technologies such as multi-charge level and Skip Fire engine operation improve fuel consumption in part by operating at higher manifold pressures (MAP), which reduces pumping losses. For maximum benefit in boosted engines, both preferably operate in boost to some extent. A challenge that occurs in both technologies is that airflow will generally be lower at a given intake manifold pressure (MAP) or compressor pressure ratio (PR). Multi-level skip fire will tend to further increase the MAP and boost demand.

FIG. 1 shows a representative radial compressor efficiency map from a production turbocharger. As can be seen in the graph, higher compressor pressure ratios generally require higher mass flow rates of exhaust gases through the engine. In general, higher pressure ratio (PR) vs mass flow requirement means traversing the compressor map more vertically, which has the effect of reducing compressor efficiency and requiring higher compressor speeds. During an increasing torque and MAP transient event, these two requirements result in increased turbocharger lag and an associated torque delay (sometimes referred to as torque sag) because of the feedback loop between the turbine, compressor and engine. This applies to an increasing engine torque event, such as an accelerator tip-in, or an increasing cylinder torque event, such as transitioning to a lower firing fraction. The compressor would also generally operate closer to the surge line (top boundary of compressor map) in such circumstances.

In an mDSF engine, it is possible to leverage dynamic charge management (Hi/Lo Fire or HF) and dynamic skip fire to improve the initial torque response while simultaneously reducing the turbo lag to reach the boosted fuel-optimal steady-state point in a timely manner. Conceptually, the goal is to temporarily increase the flow rate of air/gases through the engine at a lower compressor PR and MAP and thereby deliver more energy into the turbocharger turbine while extracting less power from the compressor. This allows the turbine to spin up more quickly and can be achieved through a combination of one or more of: increasing the firing fraction (FF); increasing the high fire fraction (HF); various valve actuation management schemes (e.g. varying the intake/exhaust cam phasing, variable valve timing (VVT), variable valve lift (VVL), variable valve actuation (VVA), etc.); varying the turbine blade pitch angle (as is possible with variable geometry turbochargers (VGTs)), etc. Once the turbine speed has been increased sufficiently, the compressor pressure ratio may be increased more aggressively. The strategy can be implemented either as a discrete mode switch with entry/exit criteria based on the magnitude of torque and MAP error, or as a continuous adjustment where the errors are directly used to determine the control extent.

FIGS. 2(a)-2(e) are a series of graphs that conceptually illustrate the proposed strategy in its continuous control implementation. During the first phase of the fast transient maneuver, one or more selected control parameter(s) (e.g., HF, FF and/or valve or turbine settings) will be rapidly moved to an intermediate setting that facilitates the rapid delivery (and possibly over-delivery) of the requested torque. As soon as the requested torque is achieved and manifold pressure begins increasing as a result of turbo speed increasing, the control parameters are transitioned to their nominal fuel-optimal settings until the desired targets are achieved. During the initial phase, it may be desired to over-deliver air and manage the torque overshoot using spark retard. This further enhances the anti-lag potential of the control strategy. Even though this strategy purposely operates briefly at less fuel-efficient conditions, the result is faster and more accurate torque delivery which is expected to have a net positive effect on fuel economy.

Figure 3:
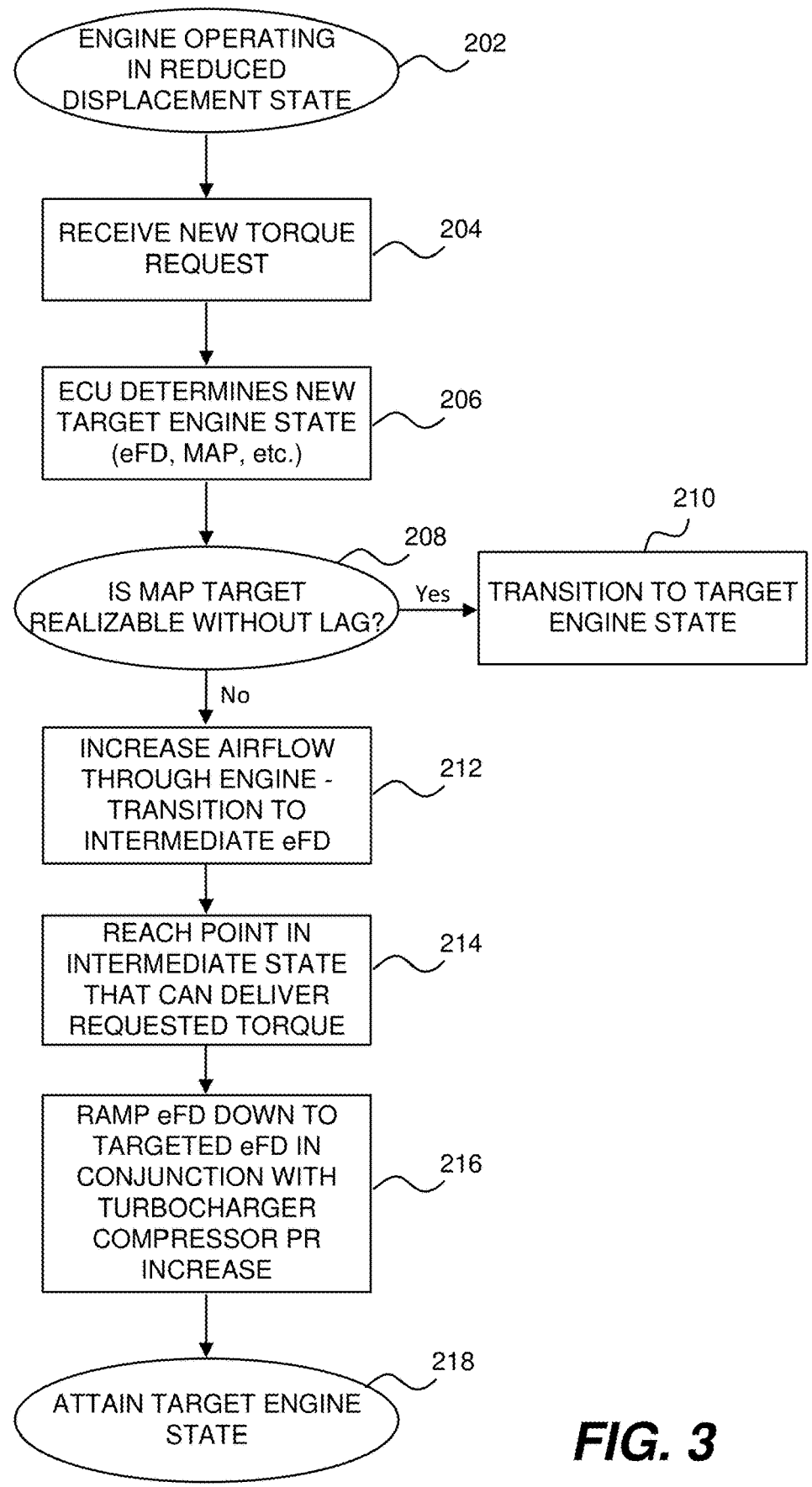
FIG. 3 is a flow chart illustrating a method of controlling transient response to certain engine or cylinder torque increase requests in a turbocharged engine.

Referring next to FIG. 3, a representative method of managing a torque request increase during cylinder output level modulation operation of a turbocharged engine in accordance with one embodiment will be described. The process begins with the engine operating in a reduced displacement state as represented by block 202. This reduced displacement "initial" engine state can be skip fire, multi-level skip fire or multi-charge level operating mode with an effective firing density (eFD) of less than one (eFD<1). In the initial state, engine setting such as intake manifold pressure (MAP), valve timing, fuel charge, spark timing, etc. are set appropriately and the turbocharger compressor is operating at an initial pressure ratio.

When a new torque request is received (as represented by block 204), the engine controller determines a target engine state as represented by block 206. The target engine state may involve a different effective firing density, different valve settings and/or a different target MAP (which may require a different target compressor pressure ratio) than the initial engine state.

Some target intake manifold pressures can be readily achieved based on current operating conditions. However, others may require turbocharger compressor pressure ratios that are not immediately achievable given the current mass flow rate of air/gases through the engine. This distinction is represented by decision block 208 in FIG. 3. If the target MAP is readily achievable without experiencing turbo lag, a transition is made to the target state as represented by block 210. However, if the target MAP is not readily achievable, (the "No" branch from decision block 208), efforts may be made to mitigate the lag (i.e., provide a fast torque response) in a fuel efficient manner as will be described in more detail below.

One of the most common scenarios in which turbo lag occurs is accelerator tip-in. One such scenario is when the driver depresses the accelerator pedal when the engine is idling (or otherwise operating at a relatively low output level), thereby requesting significantly more engine torque. Of course, the same can occur anytime the driver (or an autonomous vehicle controller) significantly increases the engine torque request. In such cases the target engine state may have a desired intake manifold pressure (MAP) that cannot be immediately attained by the turbocharger, resulting in an actual engine output that is lower than the desired engine output due to turbo lag. Turbo lag can also occur in circumstances in which cylinder load demand increases (requiring a corresponding increase in the turbocharger compressor pressure ratio) as may occur when the firing fraction is reduced in skip fire operation of a boosted engine.

At this point it is worth noting that a simple approach to managing the engine state transition is to simply transition to the target effective firing density and in parallel, command the turbocharger to deliver a target pressure ratio required to provide the target MAP. However, if the turbocharger is operating in a region where there is not a sufficient mass flow of air/gases through the turbocharger turbine, it will take time to spin the turbocharger up sufficiently to deliver the target compressor PR/MAP and there will be a corresponding torque sag due to this turbo lag.

Figure 2A:
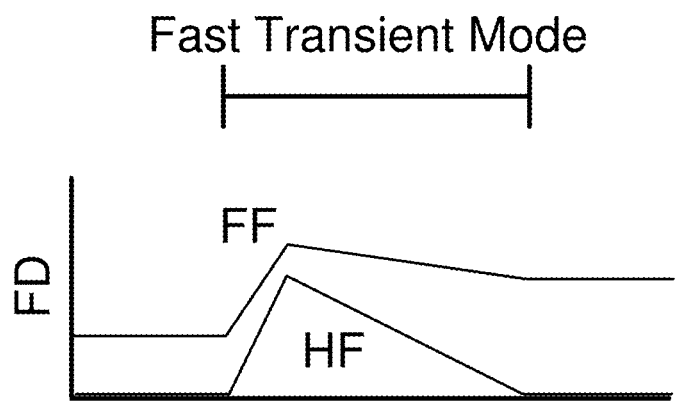
FIGS. 2A-2E are a series of graphs diagrammatically illustrating a control scheme for controlling transient response to certain engine or cylinder torque increase requests in a turbocharged engine.

Returning to FIG. 3, in order to provide a faster torque response and thereby mitigate the turbo lag, actions are taken to increase the gas flow rate through the engine. This can be accomplished, at least in part, by transitorily increasing the effective firing density of the engine relative to both the initial and target eFDs (block 212, which follows the "No" branch from decision block 208). The higher eFD can be realized by increasing one or both of the high fire fraction (HF) and the firing fraction (FF). In some implementations, the transition to the intermediate eFD may be accomplished in a single step. In others, the increase may be aggressively ramped. FIG. 2(a) diagrammatically illustrates a linearly ramped approach. In still other approaches, the ramping may be controlled as a function of torque and MAP errors. When operating conditions permit, the air flow rate can be further increased by adjusting the cam settings to induct a larger air charge in each active cylinder working cycle as diagrammatically illustrated in FIG. 2(b).

Notably, the intermediate eFD and cam setting are selected to increase airflow through the engine relative to both the airflow at the initial settings and the airflow at the target settings. Thus, in general the intermediate eFD is higher than the target eFD.

Transitioning to the intermediate eFD serves multiple benefits. One benefit is that the higher eFD allows the boosted engine to more rapidly deliver the desired torque than it would if the target eFD is used. Thus, a faster torque response is provided improving drivability and performance. Additionally, use of a higher eFD increases the air/gas flow through the engine. The higher gas flow rate allows the turbocharger turbine to spin up more quickly—which, in turn facilitates reaching the target compressor ratio more quickly than it can be achieved by using the target eFD during the transition. Changes to cam settings to increase the air charge in the fired cylinders can further increase airflow.

Figure 2B:
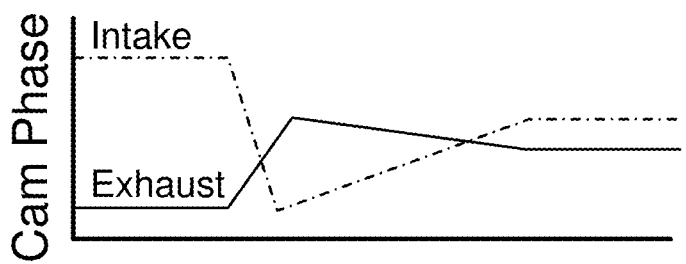
Figure 2C:
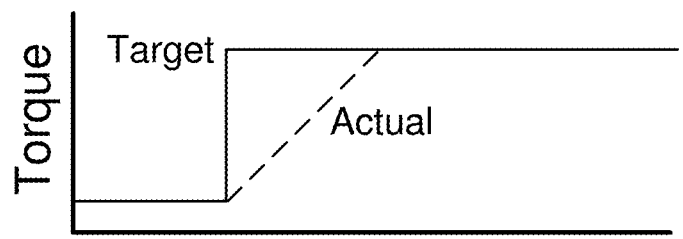
Figure 2D:
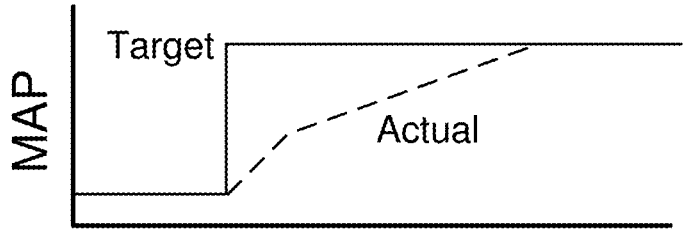
Figure 2E:
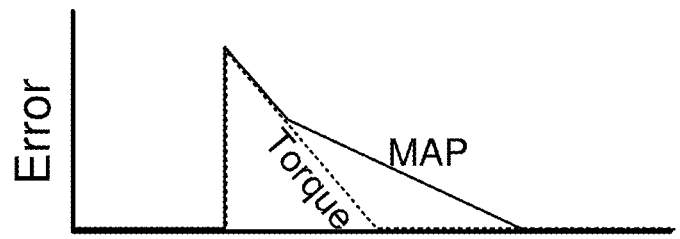

Once the engine is in a state where it can produce the desired torque, (as represented by block 214), the engine controller gradually reduces airflow through the engine in parallel with increasing the turbocharger's compressor pressure ratio to the target pressure ratio while continuing to deliver the requested torque (as represented by block 216). One aspect of this transition is gradually transitioning the effective firing density from the intermediate eFD to the target eFD. When appropriate, the cam settings can be gradually adjusted towards the target cam settings in parallel with the transition to the target eFD as represented by FIG. 2(b).

The gradual reduction of airflow and/or effective firing fraction may be accomplished in a variety of manners. In some implementations, a linear ramp or other predefined path may be used. In others, the ramping may be controlled as a function of torque and MAP errors. In some preferred embodiments, the effective firing density, the compressor pressure ratio, the cam setting and other engine settings are controlled such that the engine operates efficiently while neither producing excess torque nor experiencing a torque sag through the gradual transition from the intermediate eFD to the target eFD. Once the target eFD is attained, the engine operated in the target engine state as represented by block 218.

As will be appreciated by those familiar with skip fire engine control, fuel economy is generally improved with the use of lower firing fractions. Therefore, it is generally desirable to begin ramping down to the target eFD once the engine is producing the desired torque. However, the rate of the ramping down will be dictated in large part by engine airflow dynamics to avoid torque sags during the transition.

The manner that the effective firing density is changed during the transition may vary based on a variety of factors including the type of control supported by the engine controller, as well as the nature of the initial and target engine states. For example, if the engine controller supports skip fire engine operation, but not multi-level cylinder outputs, only the firing fraction can be adjusted. Conversely, if the engine controller supports multi-charge level operation, but not skip fire operation, then only the high fire fraction can be adjusted. When multi-level skip fire is supported, than one or both of high fire fraction and firing fraction can be adjusted.

In some specific embodiments, the transition from the initial settings to the intermediate settings is made without changing the requested compressor pressure ratio (i.e., while holding the compressor ratio constant). This allows the turbocharger to spin up quickly while rapidly transitioning to a state that is able to effectively deliver the desired torque. Once the engine is producing the desired torque at the intermediate state, the compressor pressure ratio can be gradually increased to the target pressure ratio while gradually reducing the operation effective firing density to the target eFD while continuing to deliver the desired torque. This two stage approach is illustrated in FIGS. 2(a)-2(e). In the first stage the airflow through the engine is increased (by increasing eFD, adjusting the cam settings while holding the compressor pressure ratio constant. In throttled engines, the airflow can be further enhanced by opening the throttle. In the second stage, the compressor pressure ratio is increased while continuing to deliver the desired torque. Our testing has shown that this two stage approach can provide a fast torque response in a fuel efficient manner.

When the target conditions allow, it can be particularly desirable to control the eFD during the transition from the intermediate state to the target state by only modulating (gradually reducing) the high fire fraction (HF). This is most practical when the target engine state has a relatively lower high fire fraction. In some specific circumstances, the intermediate state may be a multi-level skip fire operating state that utilizes the target firing fraction and a high fire fraction that is higher than the target high fire fraction—e.g., a high fire fraction of "1" although lower high fire fractions may be used as appropriate. When the intermediate state has the same firing fraction (but higher high fire fraction) than the target state, the transition from the intermediate state to the target state can be accomplished by varying the high fire fraction (and potentially cam and other settings) while maintaining the firing fraction constant. Such an approach tends to have particularly good NVH characteristics.

It should be appreciated that in some applications, a torque reserve may be desired through the transition (that is, it may be desirable to maintain the ability to almost instantaneously increase to torque output through at least some of the transition). If such a torque reserve is desired, the gradual ramp down to the target eFD can be controlled so that the engine is capable of producing excess torque and the excess torque can be mitigated using conventional techniques such as spark retard.

It is worth noting that since the transition to the target eFD occurs more quickly when using an intermediate eFD that is higher than the target eFD, the overall fuel economy associated with the transition can often be improved relative to a direct transition from the initial engine state to the target engine state. This is because the target engine state is typically more fuel efficient than transitional states and thus the quicker transition to the more fuel efficient state reduces the overall fuel consumption associated with the transition.

The specific intermediate eFDs most suitable for use in specific transitions will vary based on a number of factors including the initial engine state, the target engine state, engine airflow dynamics, drivability concerns, NVH (noise, vibration and harshness) concerns, etc. As such, the specific intermediate eFDs used in specific circumstances may vary in accordance with the design goals of the manufacturer. In some circumstances, it may be desirable to use an effective firing density or a firing fraction of one (i.e. all cylinders firing) as the intermediate eFD. However, in many circumstances, better fuel efficiency and very good transitory response can be attained by using an intermediate eFD that is less than one. When the high fire fraction is a variable that can be controlled and the target eFD has a relatively low HF, in some specific operating circumstances it may be desirable to use a HF=1 and the target firing as the intermediate eFD. When this is done, the transition from the intermediate eFD to the target eFD can be accomplished solely via ramping the high fire fraction which is particularly easy.

The discussion above focuses primarily on varying the effective firing density in an effort rapid torque response in a fuel efficient manner. It should be appreciated that some engines will have other mechanism that can be used in parallel with firing density changes to further improve the transient torque response or even in place of firing density changes when firing density changes are not possible or appropriate. Some such approaches will be described with reference to FIG. 4.

Figure 4:
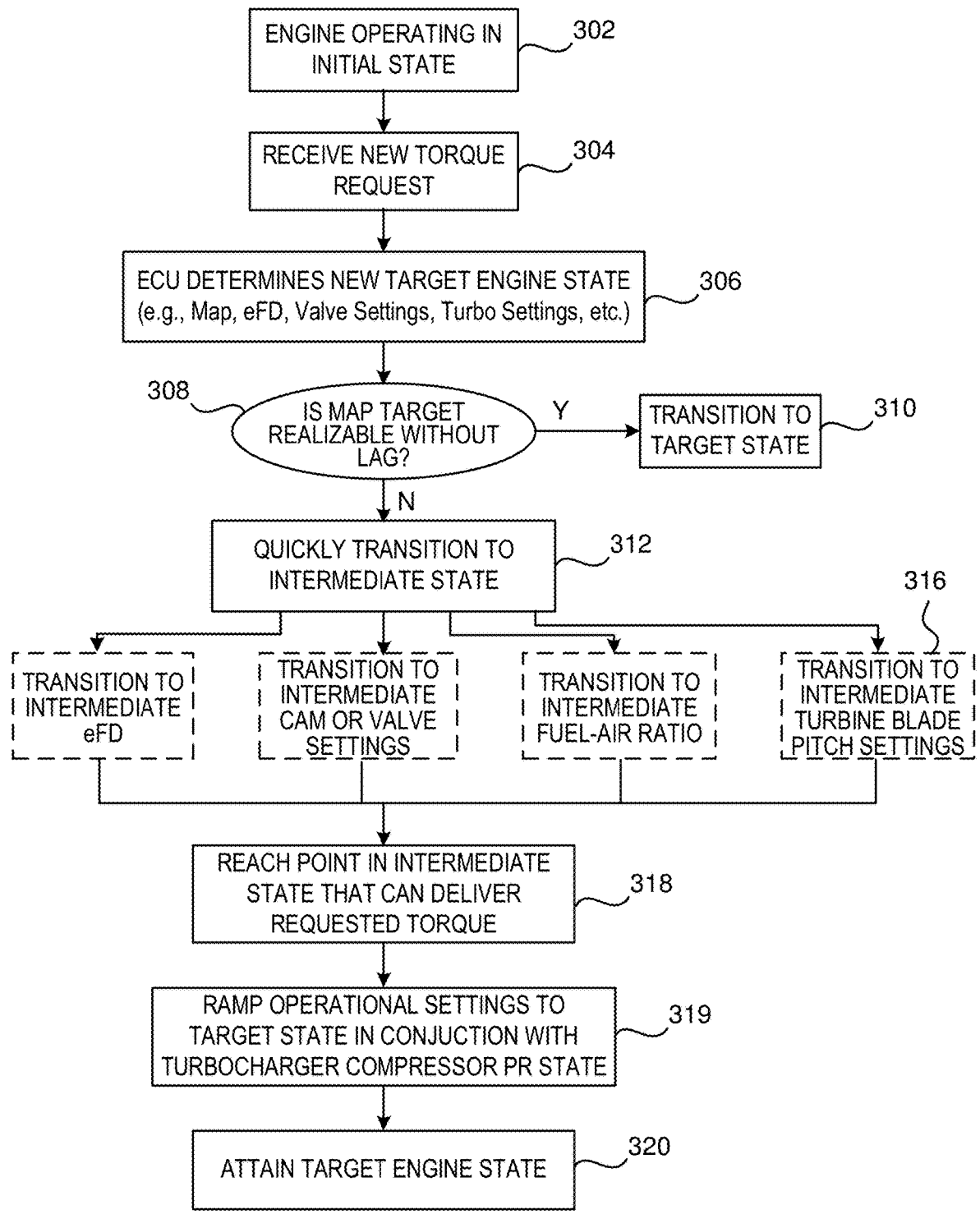
FIG. 4 is a flow chart illustrating another method of controlling transient response to certain engine or cylinder torque increase requests in a turbocharged engine.

Much like the previous embodiment, the embodiment of FIG. 4 begins with the engine operating in an initial state (which may or may not be a reduced effective displacement state). Block 302. When a new torque request is received (block 304), the engine controller (e.g., ECU) determines a new target engine state. Block 306. The target engine state may have an associated target MAP, target eFD, target valve actuator settings, target turbine settings, target fuel charge setting(s), etc.

As previously described, the engine controller effectively determines whether the target MAP is attainable without experiencing lag (block 308), and if so, it directs a transition to the target state (block 310). If/when the target MAP would not be realizable without experiencing turbo lag, the controller directs an immediate (or otherwise quick) transition to selected intermediate settings that help facilitate more rapid delivery of the requested torque in a fuel efficient manner as represented by block 312. When the engine is operating at a reduced effective firing density, this can include a transition to an intermediate eFD that is higher than the target eFD as previously discussed with respect to FIG. 3 and as represented by optional block 313. Additionally, when other mechanisms are available to quickly and efficiently increase the airflow through the engine or the efficiency of the turbine, those mechanisms may be used as well. As suggested above, there are a number of valve management strategies that can be used to increase the air charge introduced into the cylinders. For example, if the engine has cam systems that can be adjusted to vary the air charge introduced into the (active) cylinders, the commanded cam (or other valve actuation) settings may be quickly changed to increase the air charge. As will be appreciated by those familiar with the art, there are a variety of different valve control technologies that can be used to control the cylinder air charge. These may include cam phasers, variable valve timing systems (VVT systems), variable valve lift systems (VVL systems), variable valve actuation systems (VVA systems), etc. Often these technologies can be used to quickly increase the air charge introduced to the cylinders during active cylinder working cycles to an intermediate air charge level that is at higher than either the initial air charge or the target air charge, thereby increasing/further increasing the airflow through the engine. With the larger relative air charges, correspondingly more fuel can be introduced to the fired cylinders, which also allows additional torque to be generated more quickly. Adjusting the air charge via cam settings or valve actuation adjustments is represented by optional block 314 in FIG. 4.

In diesel and other lean burn engines, additional torque can also sometimes be generated by transitorily increasing the fuel charge independently of changes in the air charge—that is, by increasing the fuel to air ratio. In many circumstances it is desirable to keep the air to fuel at a designated level (e.g., XX:1) or within a defined range (e.g., in the range of YY:1 to ZZ:1) for various fuel efficiency and emissions control reasons. However, it may be perfectly acceptable to go utilize a higher fuel to air ratio (with corresponds to a lower air to fuel ratio) for a brief period during the transition without experiencing any significant adverse effects. The extra fuel provides several transitory benefits including (a) extra immediate torque—which helps attain the desired torque more quickly; and (b) hotter exhaust gases, which allows the turbocharger turbine to extract more energy from the exhaust stream than it would otherwise extract. Often a limit on the fuel to air ratio in a lean burn engine would be a stoichiometric fuel to air ratio although there may be benefits in even richer fuel air ratios in some circumstances. Adjusting the fuel charge to an intermediate fuel-air ratio is represented by optional block 315 in FIG. 4.

Some engines (most commonly larger diesel engines) include a variable geometry turbocharger (VGT). VGT's typically allow adjustment of the turbine blade pitch angle. When turbine blade pitch adjustment is possible, the blade pitch can also be very quickly adjusted to an intermediate pitch angle that is different than either the initial pitch angle or the target pitch angle in response to the torque request. Typically, the intermediate pitch angle would be a higher pitch angle than either the initial pitch angle or the target pitch angle, although the specific pitches that would be appropriate in any particular transition would depend heavily on both the initial engine state and the target engine state. The higher pitch angles are often transitorily desirable when trying to increase the boost ratio because they facilitate extracting more energy from the exhaust stream for driving the compressor. As such, when a variable geometry turbocharger is present, the turbine blade pitch may be transitorily adjusted to an intermediate pitch setting that facilitates more quickly increase the boost ratio which can help speed the engine more quickly attain the desired torque output in a fuel efficient manner. Adjusting the turbocharger geometry (e.g., the blade pitch) to an intermediate setting is represented by optional block 316 in FIG. 4.

It should be appreciated that for any particular transition any one of the mechanisms represented in blocks 313-316 may be utilized alone or in any available combination (including all of the available mechanisms) to help increase the airflow through the engine and/or the torque response during the transition.

Once an intermediate state is reached that can deliver the requested torque (block 318), each of the variables that transitioned to an intermediate setting that is/was different than the target setting may then be transitioned to the corresponding target setting in conjunction with the turbocharger compressor pressure ratio increases in a controlled manner to deliver the requested torque in an efficient manner (blocks 319, 320). When multiple component settings are set to an intermediate state that is different than both the initial state and the target state, the order in which they are transitioned to the target state may vary based on the circumstances. In some situations, two or more settings may be ramped in parallel from their intermediate settings to the target settings. In other circumstances, it may be desirable to ramp one of the variables (e.g., fuel-air ratio, or blade pitch) first followed by variables such as effective firing density, valve settings, etc.

Although only a few embodiments of the invention have been described in detail, it should be appreciated that the invention may be implemented in many other forms without departing from the spirit or scope of the invention. Therefore, the present embodiments should be considered illustrative and not restrictive and the invention is not to be limited to the details given herein, but may be modified within the scope and equivalents of the appended claims.

The described approach has the benefit of providing a fast torque response to the driver's request for more power (or other cylinder output change requests) in a fuel efficient manner. The description above has focused primarily on varying the effective firing density (and especially the high fire fraction) to increase airflow through the turbocharger during transients that require a higher turbocharger compressor pressure ratio than can be a readily/rapidly achieved by directly commanding such a pressure ratio. However, it should be appreciated that in some specific instances a suitable airflow increase may be achieved through modulation of the cylinder air charge using cams alone.

In some described embodiments, the spin-up of the turbocharger is accomplished while maintaining the compressor pressure ratio constant. This works well in both throttled and unthrottled engines. However, it should be appreciated that in some circumstances, the compressor pressure ratio may be increased somewhat between the initial and intermediate states if desired. In throttled engines, the MAP may actually be increased.

The described approaches are very well suited for use in a wide variety of boosted internal combustion engines. The various described approaches work with engines that operate under a wide variety of different thermodynamic cycles, including diesel and other compression ignition engines, Otto cycle engines, Dual cycle engines, Miller cycle engines, Atkinson cycle engines, lean burn engines, Wankel engines and other types of rotary engines, mixed cycle engines (such as dual Otto and diesel engines), hybrid engines, radial engines, including virtually any type of four or two stroke piston engines, etc. It is also believed that the described approaches will work well with newly developed internal combustion engines regardless of whether they operate utilizing currently known, or later developed thermodynamic cycles. These include engines for virtually any type of vehicle—including cars, trucks, boats, aircraft, motorcycles, scooters, etc.; and virtually any other application that involves the firing of working chambers and utilizes a boosted internal combustion engine.

Diesel and other compression ignition engines have unique requirements. In such engines the selection of the target and intermediate firing densities as well as the ramps between states may be dictated in large part by emissions related considerations such as maintaining a desired temperature or temperature range in an exhaust emissions control system. Typically, the fuel charge, the air-fuel ratio and/or the exhaust gas recirculation (EGR) can be controlled in diesel and other compression ignition engines and those variables can incorporated into the turbocharger/torque control strategy.

In throttled engines, the intake manifold pressure and thus the airflow through the engine may be further increased by opening the throttle if/when the initial engine state was at least partly throttled.

What is claimed is:

1. An engine controller for controlling a boosted engine including a turbocharger having a turbine and a compressor and configured to direct operation of the engine and being further configured to:
   in response to a selected torque request, determine that a transition from a first engine state to a target engine state is desired, the first engine state having an associated first engine torque output, an associated first compressor pressure ratio and at least one additional initial engine setting(s), and the target engine state having an associated target engine torque output, an associated target compressor pressure ratio that is higher than the first compressor pressure ratio and at least one additional target engine setting(s), each additional target engine setting corresponding to an associated one of the additional initial engine setting(s);

in response to the determination that the transition from the first engine state to a target engine state is desired, direct the engine to transition to at least one second additional engine setting(s) that is/are different than the first and target additional engine settings and outside of a range between the first and target additional engine settings to thereby directly or indirectly increase a flow of gases through the engine and the turbocharger; and after reaching the second additional engine setting(s) and producing the target torque at the second additional engine setting(s), adjusting at least one operational engine setting(s) from the second additional engine setting(s) to the target additional engine setting(s) while increasing an operational compressor pressure ratio to the target compressor ratio.

2. An engine controller as recited in claim 1 wherein the at least one initial setting includes an initial valve actuation setting, whereby an intermediate valve actuation setting is outside of a range between the initial valve actuation setting and a target valve actuation setting such that air charges associated with cylinder induction events during a transition period between the first engine state and a point at which the engine is producing the target torque at the second engine setting(s), are greater than the air charges would have been if either the initial valve actuation setting or the target valve actuation setting were used during the transition period.

3. An engine controller as recited in claim 1 wherein the at least one initial setting includes an initial effective firing density (eFD), whereby an intermediate eFD setting is higher than both the initial eFD and a target eFD.

4. An engine controller as recited in claim 1 wherein the at least one initial setting includes an initial fuel-air ratio, whereby an intermediate fuel-air ratio is higher than both the initial fuel-air ratio and a target fuel-air ratio.

5. An engine controller as recited in claim 1 wherein the turbocharger is a variable geometry turbocharger having a variable turbine blade pitch and the at least one initial setting includes an initial turbine blade pitch, whereby an intermediate turbine blade pitch is higher than both the initial turbine blade pitch and a target turbine blade pitch.

6. An engine controller as recited in claim 1 wherein the adjusting of the at least one operational engine setting(s) from the second additional engine setting(s) to the target additional engine setting(s) while increasing an operational compressor pressure ratio to the target compressor ratio is a gradual adjustment that only begins after the engine is producing the target engine torque.

7. An engine controller as recited in claim 6 further comprising controlling the engine to deliver the target engine torque throughout the gradual adjustment of the at least one operational engine setting(s) from the second additional engine setting(s) to the target additional engine setting(s).

8. An engine controller as recited in claim 1 wherein the engine is not capable of immediately delivering the target engine torque at the target engine settings and the adjustment of the at least one operational engine setting from the second additional engine setting(s) to the target additional engine settings does not begin until the engine is, or is estimated to be, delivering the target engine torque and the target engine torque is delivered throughout the adjustment.

9. An engine controller as recited in claim 2 wherein the valve actuation settings are selected from the group consisting of valve lift settings, valve timing settings and cam phase settings.

10. An engine controller as recited in claim 1 wherein the adjustment is controlled as a function of observed torque and intake manifold pressures relative to the target engine torque and a target intake manifold pressure respectively.

11. An engine controller as recited in claim 1 wherein an overall fuel efficiency associated with the transition from delivering the first engine torque to delivering the target engine torque using the second additional engine settings is higher than a transition overall fuel efficiency would be if an immediate change to the target additional engine settings at the target compressor pressure ratio were commanded.

12. An engine controller as recited in claim 1 wherein the request to transition to the target state is due to accelerator tip-in.

13. An engine controller as recited in claim 1 wherein the engine is one selected from the group consisting of a spark ignition engine, a diesel engine and a compression ignition engine.

14. An engine controller for controlling a boosted engine including a turbocharger having a turbine and a compressor and configured to direct operation of the engine and being further configured to:

in response to a selected torque request, determine that a transition from a first engine state to a target engine state is desired, the first engine state having an associated first engine torque output, an associated first firing density and an associated first compressor pressure ratio, and the target engine state having an associated target engine torque output, an associated target firing density and an associated target compressor pressure ratio that is higher than the first compressor pressure ratio;

in response to the determination that the transition from the first engine state to a target engine state is desired, direct the engine to transition to a second firing density that is higher than the first firing density and higher than the target firing density thereby increasing a flow of gases through the engine and the turbocharger; and after reaching the second firing density and producing the target torque at the second firing density, reducing an operational firing density from the second firing density to the target firing density while increasing an operational compressor pressure ratio to the target compressor ratio.

15. An engine controller as recited in claim 14 wherein the engine is one selected from the group consisting of a spark ignition engine, a diesel engine and a compression ignition engine.

16. An engine controller as recited in claim 14 wherein the first engine state further includes an initial valve actuation setting and the target engine state further includes a target valve actuation setting, the engine controller being further configured to direct a transition to an intermediate valve actuation setting in response to the selected torque request, the intermediate valve actuation setting being outside of a range between the initial valve actuation setting and the target valve actuation setting such that air charges associated with cylinder induction events during a transition period between the first engine state and a point at which the engine is producing the target torque at the second engine setting(s), are greater than the air charges would have been if either the initial valve actuation setting or the target valve actuation setting were used during the transition period.

17. An engine controller as recited in claim 16 wherein the valve actuation settings are selected from the group consisting of valve lift settings, valve timing settings and cam phase settings.

18. An engine controller as recited in claim 14 wherein the first engine state further includes an initial fuel-air ratio and the target engine state further includes a target fuel-air ratio, the engine controller being further configured to direct a transition to an intermediate fuel-air ratio in response to the selected torque request, wherein the intermediate fuel-air ratio is higher than both the initial fuel-air ratio and the target fuel-air ratio.

19. An engine controller as recited in claim 14 wherein the turbocharger is a variable geometry turbocharger having a variable turbine blade pitch and the first engine state further includes an initial turbine blade pitch and the target engine state further includes a target turbine blade pitch, the engine controller being further configured to direct a transition to an intermediate in response to the selected torque request, wherein the intermediate turbine blade pitch is higher than both the initial turbine blade pitch and a target turbine blade pitch.

20. An engine controller as recited in claim 14 configured such that the operational firing density reduction only begins after the engine is producing the target engine torque.

21. An engine controller as recited in claim 20 further configured to control the engine to deliver the target engine torque throughout the reduction of the firing density from the second firing density to the target firing density.

22. An engine controller as recited in claim 14 wherein the engine is not capable of immediately delivering the target engine torque at the target firing density and the reduction of the firing density from the second firing density to the target firing density does not begin until the engine is, or is estimated to be, delivering the target engine torque and the target engine torque is delivered throughout the reduction.

23. An engine controller as recited in claim 14 wherein a fraction of the second firing density relative to a maximum firing density is less than one.

24. An engine controller as recited in claim 14 wherein the operational firing density reduction is accomplished at a constant firing fraction by varying a fraction of fired cylinder working cycles that are fired at a higher output level verses fired at a lower output level.

25. An engine controller as recited in claim 14 wherein the operational firing density reduction is controlled as a function of observed torque and intake manifold pressures relative to the target engine torque and a target intake manifold pressure respectively.

26. An engine controller as recited in claim 14 wherein the operational firing density reduction is accomplished by reducing an operational firing fraction.

27. An engine controller as recited in claim 14 wherein the operational firing density reduction is accomplished by reducing both an operational firing fraction and an operational high fire fraction that is indicative of a percentage of fired cylinder working cycles that are fired at a higher output level verses fired cylinder working cycles that are fired at a lower output level.

28. An engine controller as recited in claim 14 wherein the transition to a second firing density is immediate.

29. An engine controller as recited in claim 14 wherein the transition to a second firing density is gradual.

30. An engine controller as recited in claim 14 wherein an overall fuel efficiency associated with the transition from delivering the first engine torque to delivering the target engine torque using the intermediate second firing density is higher than a transition overall fuel efficiency would be if an immediate change to the target firing density at the target compressor pressure ratio were commanded.

31. An engine controller as recited in claim 14 wherein the engine controller is configured to direct operation of the engine in a cylinder output level modulation mode.

32. An engine controller as recited in claim 14 wherein the target firing density is less than or equal to the first firing density and the target compressor pressure ratio is higher than the first compressor pressure ratio.

33. An engine controller as recited in claim 14 wherein the engine controller is configured to gradually reduce the operational firing fraction from the second firing density to the target firing density.

34. An engine controller for controlling a boosted engine including a turbocharger having a turbine and a compressor and configured to direct operation of the engine and being configured to:
in response to a selected torque request, determine that a transition from a first engine state to a target engine state is desired, the first engine state having an associated first engine torque output, an associated first firing density, an associated first compressor pressure ratio, and a first mass airflow rate, and the target engine state having an associated target engine torque output, an associated target firing density, a target mass airflow rate, and an associated target compressor pressure ratio that is higher than the first compressor pressure ratio;
in response to the determination that the transition from the first engine state to a target engine state is desired, direct the engine to transition to a second engine state while maintaining the first compressor pressure ratio, the second engine state having second mass airflow rate that is higher than the first mass airflow and higher than the target mass airflow rate; and
after reaching the second engine state and producing the target torque at the second engine state, reducing an operational mass airflow rate to the target mass airflow rate while increasing an operational compressor pressure ratio to the target compressor ratio.

35. An engine controller as recited in claim 34 wherein the second firing density is higher than the first and target firing densities and variations in an operational mass airflow rate that occur through the transition are accomplished at least in part through variations in an operational mass airflow rate.

36. An engine controller as recited in claim 34 wherein variations in an operational mass airflow rate that occur through the transition are accomplished at least in part by varying operational cam settings throughout the transition.

37. An engine controller as recited in claim 34 wherein the engine is a throttled engine and the increase in the operational mass airflow rate in the transition from the first engine state to the second engine state is accomplished at least in part by varying an operational throttle setting.

38. An engine controller as recited in claim 34 wherein the engine is one selected from the group consisting of a spark ignition engine, a diesel engine and a compression ignition engine.

* * * * *